Nov. 27, 1962      G. A. JEFFREYS      3,066,029
PROCESS FOR MAKING YEAST LEAVENED BAKED PRODUCTS
Filed March 11, 1960
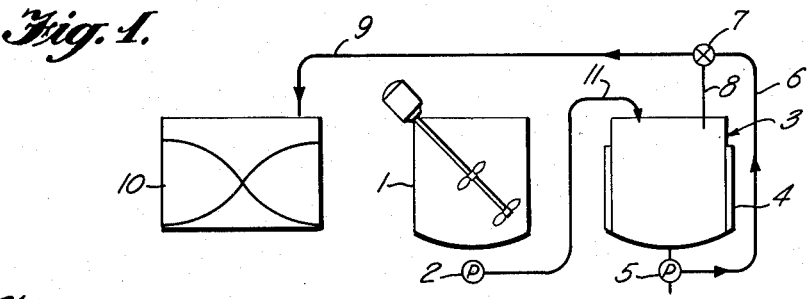
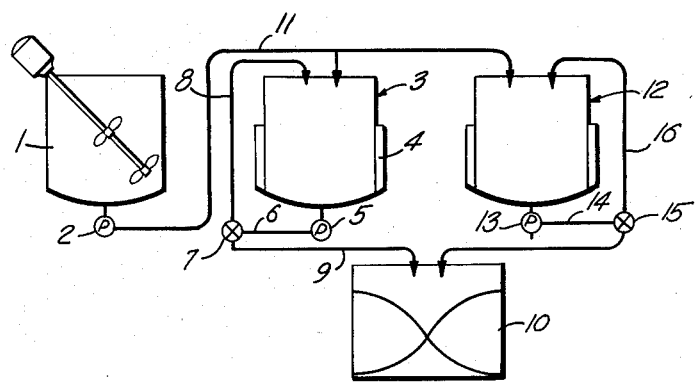
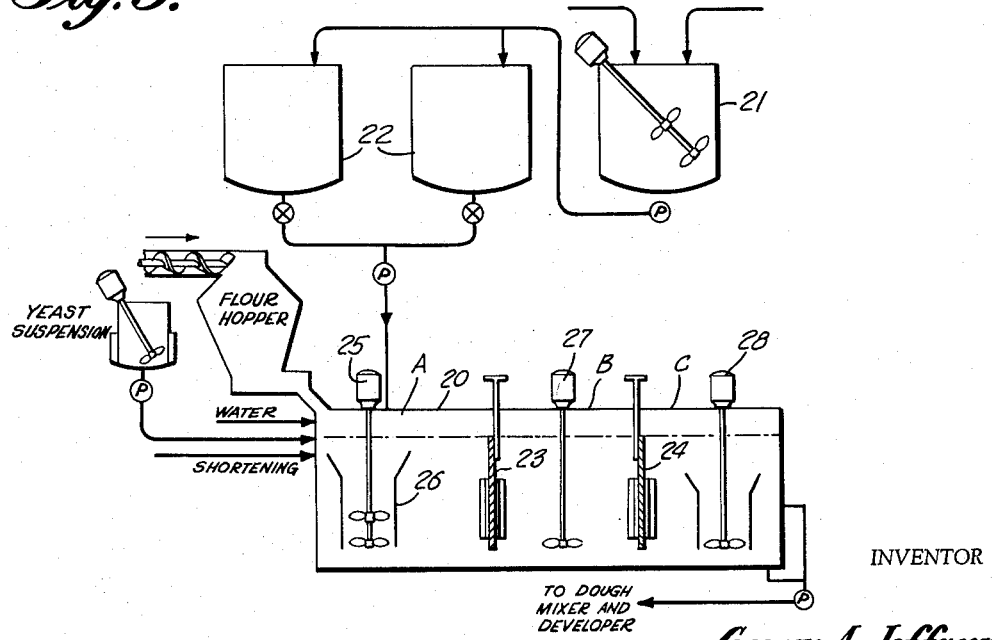
INVENTOR
George A. Jeffreys
BY Mason, Fenwick & Lawrence
ATTORNEYS

3,066,029
PROCESS FOR MAKING YEAST LEAVENED BAKED PRODUCTS
George A. Jeffreys, 219 Valleydale Ave., Salem, Va.
Filed Mar. 11, 1960, Ser. No. 14,369
17 Claims. (Cl. 99—90)

This invention relates to a new process for producing yeast leavened baked products, such as bread.

Usual bread-making practice requires fermentation time of about 3 to 6 hours after mixing of the dough in the straight dough process or sponge in the sponge and dough process and before further processing, such as floor rest time, dividing, overhead proofing, machining, panning, and final or pan proofing. Processing after the initial fermentation generally requires about 2 hours, so that the over-all time required before the dough is ready for the oven has been generally in the neighborhood of about 5 to 8 hours.

Leavening and production of desired flavor and odor components in the baked products are due to enzymes produced by the yeast. Since, for the most part, yeast enzymes are intracellular, to take effect in the dough, the enzymes must be secreted extracellularly in sufficient quantity to produce the desired fermentation and other changes.

In conventional bread-making practice, the yeast, in the usual small 2 to 3% concentration by weight of the flour, requires a substantial period of time, generally 2 hours or more, to reach the stage of active fermentation necessary for adequate production of enzymes, flavor and odor imparting components, and leavening $CO_2$. The slow start-up is, to a considerable extent occasioned by the need for the yeast to become acclimated to its nutrient environment, such as the sugars, inorganic salts, and flour. Baker's yeast is produced in dilute solution containing sucrose or dextrose as the principal sugar, so that it is, to some extent, adapted to such nutrient sugars. Such yeast is not, however, adapted to the fermentation of maltose, a sugar normally present in some degree in substantially all flours and to an increased degree in malted flours. The fermentation of the maltose component has been found to produce baked products of improved volume and texture. Normally, however, it requires several hours before the yeast can actively utilize this sugar. The salt nutrients added, particularly NaCl, as well as others, such as monocalcium phosphate, are also factors in slowing start-up of active fermentation since they depress yeast activity.

Various practices have been developed to reduce natural fermentation time but have been generally accompanied by certain disadvantages. According to one method, the amount of yeast employed has been increased from 2 to 5 fold. This produces a rapid gassing but results in an immature dough deficient in flavor and aroma. In another method, a liquid nutrient medium is fermented with yeast for 3 to 5 hours and the fermeted broth is incorporated into the dough. It is stated that the fermented broth eliminates or substantially reduces the initial fermentation period after dough formation. However, the fermented broth must be employed substantially immediately after preparation, so that each baker must make it and, in effect, include this time as part of his normal bread-making procedure.

In my patent, U.S. 2,842,442, I have disclosed an enzyme accelerator in the form of a dry solid, rapid-leavening agent prepared by culturing yeast on a liquid substrate containing sucrose or dextrose, organic nitrogen, and an aqueous extract of a culture of *Aspergillus oryzae* grown on a substrate containing cereal bran, and then drying the fermented mixture. This composition contains substantial amounts of leavening enzymes and other dough-conditioning factors, and, when added to the dough mix together with the conventional yeast greatly shortens required fermentation time without sacrifice of the desired flavor- and aroma-imparting components. The rapid-leavening, enzyme accelerator overcomes most of the difficulties encountered with prior methods referred to above and is employed in a straight dough process, since it eliminates the need for an initial sponge step. In many cases, this is an important advantage since it streamlines processing and minimizes the amount of space and equipment needed.

Elimination of the sponge step is not, however, always desirable. One reason that the sponge method is common practice is because it gives the baker increased flexibility in making adjustments in the process occasioned by such factors as variations in the flour, and, thereby, permits him to achieve a more uniformly reproducible product.

Another objective in the bread-making art which has been difficult to achieve, is a continuous process from initiation of fermentation to ovening. A satisfactory continuous process is disclosed in my copending patent application Serial No. 775,586, filed November 21, 1958, and includes the following steps:

(1) Preparation of a liquid ferment, wherein all of the yeast is mixed with a portion of the water, sugar and other essential nutrients except for flour nomally used in making the bread;
(2) Mixing of this ferment with a portion of the flour, e.g. about 10 to 20%, and the remainder of the required water, sugar and other essential nutrients to make a liquid ferment in one or two additional fermentation stages;
(3) Addition of the remainder of the flour and shortening to form the dough, which is further mixed and kneaded;
(4) Extruding; and
(5) Finishing, including cutting, weighing, rolling, panning, and ovening, in a continuous sequence.

The fermentation and liquid ferment steps, 1 and 2, produce, in continuous fashion, a material, which, upon addition of the remainder of the flour, and thorough mixing and kneading, forms a dough so well developed and conditioned that flour rest and proofing time could be dispensed with, thereby substantially shortening overall processing time. Fermentation steps 1 and 2, prior to dough formation, however, generally requires a minimum of about 3 hours.

The object of this invention is to provide a new process for producing yeast-leavened baked products, such as bread, which considerably reduces the fermentation time required to produce a properly conditioned dough ready for baking into a product of superior quality.

Another object is to provide a process for making yeast-leavened baked products, which includes the preparation of a well-fermented liquid ferment in a matter of minutes, thereby combining the important advantages of flexibility and uniformity with very much reduced fermentation time.

Still another object is to provide a process for making yeast-leavened products, which is particularly adapted for continuous production, although it can also be advantageously used for batch operations.

Other objects and advantages will become obvious from the following detailed description and the drawings wherein:

FIGURES 1 and 2 are diagrammatic views showing modes for carrying out the process of the invention in batch-wise operation.

FIGURE 3 is a diagrammatic view showing apparatus for carrying out the process in continuous manner.

My process can be employed for the production of a variety of yeast leavened baked products and is especially adapted for the large-scale commercial production of bread. For reasons of convenience, the following description will be given in terms of the preferred bread-making embodiment.

Broadly speaking, my process comprises the preparation of a stock, concentrated yeast suspension in which the yeast has been both adapted to ferment maltose and desensitized to salt; the use of said yeast suspension as the yeast component in the preparation of a liquid ferment together with the other normal or standard bread-making ingredients and a part of the flour; agitating the liquid ferment while permitting it to ferment for a short period of time; addition to the fermented liquid ferment of the remainder of the flour to form the dough; and finishing either in a continuous process or according to standard batch-wise procedure.

The concentrated yeast suspension is prepared by admixture of the following components:

| | Parts |
|---|---|
| Yeast (dry basis) | 40 |
| Water | 95–120 |
| NaCl | 1–3 |
| Monocalcium phosphate | [1] 0.1–0.3 |
| Malt or maltose | 0.25–2 |

[1] Optional.

Compressed yeast can advantageously be employed with adjustment in the amount of water added to compensate for its water content, which is generally about 60% by weight. Thus the formulation of the mix using compressed yeast is as follows:

| | Parts |
|---|---|
| Compressed yeast | 100 |
| Water | 35–60 |
| NaCl | 1–3 |
| Monocalcium phosphate | [1] 0.1–0.3 |
| Malt or maltose | 0.25 |

[1] Optional.

The foregoing components, upon thorough admixture, forms a concentrated yeast suspension which, after 2 to 5 hours at ordinary room temperature, during which period it is preferably agitated gently, is ready for use in the bread-making process. The suspension can be prepared in advance in amounts sufficient for one or several day runs and stored in holding tanks, preferably at a maximum temperature of about 55° F. as a safeguard against fermentation or degradation of the yeast.

Suspension of the yeast in such high concentration at least 24% by weight dry yeast in water containing no more than 1.2% weight concentration of the malt or maltose acclimates the yeast to maltose and stimulates it to produce and secrete the maltozymase enzyme system essential for the fermentation of maltose. When the suspension containing the acclimated yeast and the maltozymase enzymes is added to the liquid ferment formulation containing maltose (e.g. as a component of the flour), active fermentation of this sugar commences immediately. The maltose-adapted yeast is also apparently activated for fermentation of the other sugar components of the liquid ferment, such as sucrose and glucose, since active fermentation of these sugars also gets under way very rapidly.

The addition of sodium chloride and, preferably, also monocalcium phosphate to the concentrated yeast suspension has the important advantage of desensitizing the yeast to these salts so that they do not have a depressing or inhibiting effect on the yeast when it is introduced into the liquid ferment.

The liquid ferment is prepared by thoroughly blending the aforedescribed concentrated yeast suspension in an amount providing the desired quantity of yeast, e.g. about 2 to 3% by weight of total flour, with the other ingredients used in the bread-making process, such as the water, sugar, sodium chloride, conventional yeast foods, including nutrient and oxidizer salts such as monocalcium pohsphate, ammonium chloride, calcium sulfate, potassium bromate, potassium iodate, calcium peroxide, and the like, milk, shortening, and about 25 to 40% of the total flour, preferably about 30 to 35%, preferably with high speed agitation to form a well-homogenized suspension, and permitting active fermentation to continue in the blend for about 10 to 80 minutes, a period up to about 45 minutes generally being adequate. The agitation can be continued during the entire fermentation period or terminated after thorough blending and fine dispersion of the ingredients have been accomplished, preferably the former. The temperature of the ferment should be maintained within the range of about 78° to 90° F., preferably about 82° to 86° F. Active fermentation of all of the sugars including maltose and enzyme action on the flour to accomplish the desired leavening and production of flavor- and aroma-imparting components, such as organic acids and aldehydes, takes place during this period. The gluten and starches of the flour also become sufficiently hydrated. The fermentation and hydration are improved by thorough blending and fine dispersion of the ingredients, particularly the flour.

Fermentation time of the liquid ferment and somewhat improved flavor and aroma can be obtained by addition of an enzyme accelerator, such as the rapid-leavening agent aforedescribed and disclosed in my U.S. Patent 2,842,443 since the dried yeast culture contains active leavening enzymes and other desirable dough-conditioning components.

To obtain the desired fermentation and conditioning, it is essential that the salts, the term salts here including both NaCl and other salt type conventional yeast nutrients and oxidizing agents; sugars, e.g. sucrose and glucose; and the stated portion of flour, be incorporated into the liquid ferment. Milk, in dry solids or liquid form is also preferably included. The shortening, though preferably also added at this time, can also be incorporated into the dough with the remainder of the flour. Additional amounts of sugar can also be added to the dough, though generally this will not be necessary. The reduced fermentation time required for the ferment tends to reduce sugar addition requirements since less of the sugar is metabolically converted because of the reduced fermentation time.

Typical formulations of the liquid ferment based on 500 lbs. of total flour is as follows:

125–200 lbs. flour.

300–400 lbs. water (including water added with the maltose-adapted concentrated yeast suspension).

10–15 lbs. yeast (yeast equivalent added in the yeast suspension).

10–30 lbs. dry milk solids.

10–40 lbs. sugars (sucrose, dextrose or mixtures thereof).

7.5–12.5 lbs. NaCl.

1.25–5 lbs. of a conventional yeast food, such as a mixture of $NH_4Cl$, $CaSO_4$, $CaH_4(PO_4)_2$ and $KBrO_3$, or an enzyme accelerator, such as the dry rapid-leavening agent disclosed in U.S. 2,842,442, reinforced with such salt nutrients.

10–20 lbs. shortening (hydrogenated vegetable oil, butter, lard, etc.) equivalent to a range of approximately 1.5% to 4.1%.

0.5–2 lbs. emulsifier, e.g. glyceryl monopalmitate (optional).

After the short fermentation of the liquid ferment, it is ready for preparation of the dough by addition of the remainder of the flour. Shortening can also be added at this time. Formation of the dough can be accomplished in conventional fashion by blending and kneading the liquid ferment and flour in a mixer. It can then be finished according to conventional batch operations, including a short dough floor rest time, dividing, intermediate proofing, molding, pan proofing, and ovening. The dough, after thorough mixing and kneading for several minutes is, however, in such a well-conditioned state that it can be finished in continuous manner as will be described.

Referring now to the drawings, FIGURE 1 shows apparatus for batch operation. It will now be described in terms of a specific illustrative embodiment of my invention.

A maltose-adapted, concentrated yeast suspension was prepared by blending the following components:

| | Parts |
|---|---|
| Compressed yeast | 100 |
| Water | 50 |
| NaCl | 2 |
| $CaH_4(PO_4)_2$ | 0.2 |
| Maltose | 1 |

The mixture was gently agitated for about 3 hours at room temperature, cooled to about 50 to 55° F. and stored in a tank in readiness for the bread-making operation.

The following components were introduced into blender 1:

325 lbs. water (including water added with yeast suspension).
3.5 lbs. rapid-leavening agent disclosed in U.S. 2,942,442 fortified with $NH_4Cl$, $CaSO_4$, $CaH_4(PO_4)_2$ and $KBrO_3$.
12.5 lbs. yeast (yeast equivalent in added maltose-adapted yeast concentrate suspension).
15 lbs. dry milk solids.
25 lbs. sugars (dextrose and sucrose).
10.5 lbs. NaCl.
15 lbs. shortening—hydrogenated vegetable oil.
1 lb. monoglyceride emulsifier.
150 lbs. flour.

The ingredients were agitated at high speed in the blender until thoroughly dispersed for about 10 minutes. The suspension was then pumped by means of pump 2 via conduit 11 into holding or fermenting tank 3. Tank 3 is provided with jacket 4 to provide for the circulation of a heating fluid, if necessary, to maintain the liquid ferment at the desired temperature, which in this embodiment was 84° F. Pump 5 continuously recirculates the liquid ferment from tank 3 through conduit 6, valve 7, and back into tank 3 through tube 8. This recirculation further aids in improving dispersion of the ingredients. After 15 minutes in the fermenting tank, the liquid ferment is ready for transfer via valve 7 and conduit 9 into dough mixer 10. The entire fermenting operation, from charging of the blender 1 to discharge from fermenting tank 3, thus required about 25 minutes. Blender 1 is recharged upon emptying of its contents into tank 3, so that a recharging blend is in readiness for filling the fermenting tank as soon as the latter discharges its fermented liquid ferment into the dough mixer 10.

The remaining 350 lbs. of flour are added to dough mixer 10 along with the liquid ferment, where these components are mixed and kneaded for about 10 minutes to bring about proper dough development.

The dough was emptied into a trough and given a floor rest time of 30 minutes and an intermediate proofing of 8 minutes. The dough had a smooth, silky texture and good extensibility. It handled well in the divider and molder. After panning, it was pan proofed for 58 minutes and then baked for 20 minutes at 425° F. Total time from start of the fermentation operation until the dough was ready for ovening totaled about 2½ hours.

The baked loaves were of excellent quality. The volume was good, ovenspring excellent, and break and shred smooth. The crust color was good, showing proper aging. The crumb was smooth and white with fairly close grain.

Should a longer liquid ferment fermentation time be desired, this can be accomplished by adding a second holding or fermentation tank 12. After the ingredients of the liquid ferment are blended in blender 1 for about 10 minutes, its contents are transferred to fermenter 3, where it is treated as in FIGURE 1. Another batch is then blended in tank 1 and transferred to fermenter 12, where it is recirculated by pump 13 via tube 14, valve 15, and conduit 16. At 15 minute intervals, fermenters 3 and 12 are alternately emptied into dough mixer 10. Retention in each fermenter is thus about 30 minutes and total fermenting time from charging into blender 1 to discharge into the dough mixer is about 40 to 45 minutes.

Where continuous operation is desired, apparatus such as shown in FIGURE 3 can be employed. Elongated tank 20, which can be, for example, about 8 to 12 feet long and hold about 150 to 350 gallons, serves as the continuous blender and liquid ferment fermenter. Nutrient components, such as milk solids, rapid-leavening agent, NaCl, other salt nutrient and oxidizer additives, sugar, and the like, can be dispersed in concentrated form in a relatively small amount of water in blender 21, whence the blended nutrient mixture is transferred into one or two storage tanks 22, as shown, and then continuously metered into blending zone A of tank 20. The other ingredients, including the maltose-adapted concentrated yeast suspension, shortening, additional water, and the proper proportion of the flour, are similarly continuously metered into mixing zone A as shown. The yeast suspension can be fed from a storage tank provided with an agitator and a heating jacket to warm the suspension to the desired fermentation temperature, e.g. about 78° to 90° F. The ingredients of the ferment, in kind and quantity, can be similar to those earlier described.

Tank 20 is conveniently divided into 3 sections by means of adjustable baffles 23 and 24, which permit overflow and underflow into succeeding sections during operation but which can be closed at the bottom at start up. High speed agitating paddle 25 blends the entering ingredients being fed into zone A. Optionally, the paddle can rotate within open cylinder 26 to achieve more thorough blending of the ingredients. The blended suspension gradually flows over and under baffle 23 into zone B, where it is gently agitated by paddle 27, and then over and under baffle 24 into zone C, where it is more vigorously homogenized by high speed agitator 28.

The retention period within liquid ferment blending and fermenting tank 20 can vary from about 20 to 80 minutes as desired. In general, about 30 to 40 or 60 minutes provide all of the time required to produce the desired development. The fermented liquid ferment can then be pumped continuously together with the remainder of the flour into a continuous dough mixer, kneader, and developer, such as that disclosed and described in my aforementioned copending patent application Serial Number 775,586. As described therein, the dough mixer comprises an elongated, cylindrical casing containing forwardly and successively from the entrance at one end, where, in this process, the aforedescribed fermented liquid ferment and the remainder of the flour are continuously metered in, mixing paddles, kneading and developing impellors, and screen flights, which continuously mix, knead, and develop the dough and advance it into an extrusion chamber or die. The entire dough production proceeding requires about 4 to 10 minutes.

As further disclosed and described in my said copending application, the extruded dough can be sliced, weighed, rolled, panned, and ovened in a continuously advancing operation. Thus the entire bread-making process, from mixing of the liquid ferment and initiation of fermentation to ovening can be carried out continuously and completed in a period of time as short as about 1½ to 1¾ hours.

Bread baked by the continuous process, as aforedescribed, has excellent volume, good ovenspring, fine crumb and excellent flavor.

Although this invention has been described with reference to illustrative embodiments thereof, it will be apparent to those skilled in the art that the principles of this invention can be embodied in other forms but within the scope of the claims.

I claim:

1. In a process for making yeast-leavened baked products, the steps including: preparing a maltose-adapted, salt-desensitized, concentrated yeast suspension in water wherein the dry yeast weight concentration is at least approximately 24% and containing sodium chloride and a component in a weight concentration of less than approximately 1.2% selected from the group consisting of malt and maltose; preparing a liquid ferment by combining said concentrated yeast suspension with the ingredients normally employed in making said baked products including the water, sugar, salts, and a portion of the total flour, with agitation to produce a thoroughly blended mixture, and permitting said liquid ferment mixture to ferment; and then admixing said fermented liquid ferment with the remainder of the flour to form a dough.

2. The process of claim 1 in which the concentrated yeast suspension contains in addition, calcium monophosphate.

3. The process of claim 1 in which the concentrations of the components employed in making the maltoseadapted, salt-desensitized concentrated yeast suspension are as follows:

|  | Parts |
|---|---|
| Yeast—dry basis | 40 |
| Water | 95–120 |
| NaCl | 1–3 | and a component selected from the group consisting of malt and maltose—0.25–2 parts.

4. The process of claim 3 in which the concentrated yeast suspension contains, in addition, 0.1–0.3 part of monocalcium phosphate.

5. The process of claim 1 in which the liquid ferment is fermented with continued agitation.

6. The process of claim 2 in which the liquid ferment is fermented with continued agitation.

7. The process of claim 3 in which the liquid ferment is fermented with continued agitation.

8. The process of claim 4 in which the liquid ferment is fermented with continued agitation.

9. The process of claim 1 in which an enzyme accelerator is added to the liquid ferment mixture.

10. The process of claim 2 in which an enzyme accelerator is added to the liquid ferment mixture.

11. The process of claim 3 in which an enzyme accelerator is added to the liquid ferment mixture.

12. The process of claim 4 in which an enzyme accelerator is added to the liquid ferment mixture.

13. The process of claim 1 in which the preparation of said liquid ferment is carried out continuously.

14. The process of claim 1 in which the preparation of said liquid ferment, addition of the remaining flour to form a dough, and finishing of said dough for ovening are carried out in a continuous operation.

15. The process of claim 8 in which the preparation of said liquid ferment, addition of the remaining flour to form a dough, and finishing of said dough for ovening are carried out in a continuous operation.

16. The process of claim 9 in which the preparation of said liquid ferment, addition of the remaining flour to form a dough, and finishing of said dough for ovening are carried out in a continuous operation.

17. The process of claim 1, wherein shortening in an amount between approximately 1.5% to 4.1% is added to the liquid ferment.

References Cited in the file of this patent

UNITED STATES PATENTS

| 1,464,710 | Hixson | Aug. 14, 1923 |
| 1,534,387 | Hildebrandt et al. | Apr. 21, 1925 |
| 1,642,537 | Brown | Sept. 13, 1927 |
| 2,953,460 | Baker | Sept. 20, 1960 |